United States Patent
Dermeik et al.

(10) Patent No.: US 8,585,813 B2
(45) Date of Patent: Nov. 19, 2013

(54) FLAME RETARDANT COMPOSITION FOR COTTON ARTICLES

(75) Inventors: Salman Dermeik, Augsburg (DE); Andreas Eisele, Augsburg (DE); Waltraud Demharter, Altenmunster (DE)

(73) Assignee: Huntsman Textile Effects (Germany) GmbH, The Woodlands, TX (US)

( * ) Notice: Subject to any disclaimer, the term of this patent is extended or adjusted under 35 U.S.C. 154(b) by 0 days.

(21) Appl. No.: 13/805,727

(22) PCT Filed: Jun. 8, 2011

(86) PCT No.: PCT/EP2011/059484
§ 371 (c)(1),
(2), (4) Date: Jan. 15, 2013

(87) PCT Pub. No.: WO2012/000756
PCT Pub. Date: Jan. 5, 2012

(65) Prior Publication Data
US 2013/0220170 A1  Aug. 29, 2013

(30) Foreign Application Priority Data

Jun. 30, 2010  (EP) .................................... 10167822

(51) Int. Cl.
| | | |
|---|---|---|
| C09K 21/12 | (2006.01) | |
| C09K 21/14 | (2006.01) | |
| D06M 15/43 | (2006.01) | |
| D06M 15/431 | (2006.01) | |

(52) U.S. Cl.
USPC ....... 106/18.18; 106/18.19; 8/115.6; 8/127.1; 252/8.61; 252/601; 252/608; 427/393.3

(58) Field of Classification Search
USPC .................. 106/18.14, 18.18, 18.19; 8/115.6, 8/127.1; 252/8.61, 601, 608; 427/393.3
See application file for complete search history.

(56) References Cited

U.S. PATENT DOCUMENTS

| | | | |
|---|---|---|---|
| 2,983,623 | A | 5/1961 | Coates |
| 4,078,101 | A | 3/1978 | Cole |
| 4,145,463 | A | 3/1979 | Cole |
| 4,311,855 | A | 1/1982 | Cole et al. |
| 4,494,951 | A | 1/1985 | Cole et al. |

FOREIGN PATENT DOCUMENTS

| | | |
|---|---|---|
| DE | 1419366 | 1/1969 |
| DE | 2360723 | 6/1974 |
| EP | 0709518 | 5/1996 |
| GB | 1453296 | 10/1976 |

OTHER PUBLICATIONS

International Search Report regarding corresponding application No. PCT/EP2011/059484, dated Sep. 26, 2011.

*Primary Examiner* — Anthony J Green

(57) ABSTRACT

Compositions useful for the flame retardant finishing of cotton articles or other cellulose materials are described. The compositions are obtainable by reacting a tetrakishydroxyalkylphosphonium (THP) salt with caprolactam and urea to form a condensation product and subsequently forming a condensate from excess THP salt and excess urea. The compositions endow cotton articles with flame retardant properties and a pleasantly soft hand coupled with good durability to laundering processes.

8 Claims, No Drawings

FLAME RETARDANT COMPOSITION FOR COTTON ARTICLES

CROSS REFERENCE TO RELATED APPLICATIONS

This application is the National Phase of International Application PCT/EP2011/059484 filed Jun. 8, 2011 which designated the U.S. and which claims priority to European (EP) Pat. App. No. 10167822.5 filed Jun. 30, 2010. The noted applications are incorporated herein by reference.

This invention relates to a composition useful for treating fiber materials comprising cotton to endow these materials with flame retardant properties. This invention further relates to the use of such compositions.

It is known to treat fiber materials, particularly in the form of wovens, knits or nonwovens, with aqueous compositions comprising condensation products of a tetrakishydroxyalkylphosphonium (THP) salt and a nitrogen compound, such as urea for example. Possible fiber materials include inter alia woven fabrics composed of cellulose fibers, for example woven cotton fabrics.

Such compositions and their use are described for example in DE 23 60 723 A1, U.S. Pat. No. 4,311,855, U.S. Pat. No. 4,494,951, U.S. Pat. No. 4,145,463 and U.S. Pat. No. 4,078,101.

The compositions described in the cited references have disadvantages as well as advantages. This is because it was found that the woven fabrics treated therewith had an undesirably harsh hand. Adding softeners was unable to solve this problem because the flame retardant and/or softening finish was not found to be durable to laundering.

EP 709 518 A1 describes products comprising a condensate of THP salt and urea and also, additionally, an amine as a softener. This formulation does indeed endow textiles with a softer hand than THP salt condensates alone, but the durability of the flame retardant finish to laundering is unsatisfactory particularly when a multiplicity of washes are carried out at 95° C.

It is an object of the present invention to provide a THP salt condensate based composition which endows the fiber materials treated therewith not just with good flame retardant properties coupled with high durability to laundering processes, but also a pleasantly soft hand which is superior to the hand obtained with known THP salt condensate compositions.

This object is achieved by a composition for the flame retardant finishing of fiber materials, which is obtainable by adding caprolactam to a mixture of water and a tetrakishydroxyalkylphosphonium (THP) salt, by adding from 0.03 to 0.9 mol and preferably from 0.05 to 0.2 mol of caprolactam per mol of tetrakishydroxyalkylphosphonium cations (THP ions), subsequently maintaining the mixture at about 100° C. until essentially no free caprolactam is present any longer, then optionally adding urea and maintaining the mixture at a temperature of about 105° C. for at least 10 minutes and preferably for from 10 minutes to 2 hours, the amount of urea added being in the range from 0 to 0.7 mol and preferably in the range from 0.35 to 0.55 mol per mol of THP ions originally used.

It was found that such a composition, which contains not only a condensation product of THP salt and urea but also a condensation product of THP salt, caprolactam and urea, leads to a pleasantly soft hand for finished textiles, and that the effects are nonetheless, even after a series of washes of the textiles at 95° C., more durable than in the case of is formulations containing no condensation products of caprolactam.

Compositions according to the present invention also have the advantage of good stability in storage, providing broad latitude with regard to the timing of their possible use.

However, swapping the condensation product of THP salt and urea out of prior art formulations comprising such a condensation product and water and replacing all of it by a condensation product of THP salt, caprolactam and urea is not advantageous in most cases. This is because the consequence could be an excessive decrease in the flame retardant properties of the textile fiber materials after laundering, i.e., a deterioration in durability. Therefore, compositions according to the present invention normally, in addition to water, preferably contain not only a condensation product of THP salt and urea but also a condensation product of THP salt, caprolactam and urea. If, however, the flame retardant effects of finished fiber materials are not required to be of high durability, then the mixing ratios involved in the preparation of compositions according to the present invention can be controlled such that essentially only condensation products of THP salt, caprolactam and urea are formed, but no caprolactam-free condensation products.

The relative ratio in the amount of caprolactam to the amount of urea provides finishers with a relatively simple tool to control the softness and the durability of the flame retardant properties of the textile fiber materials in a targeted manner. When very high durability is required, the relative proportion of caprolactam will be reduced, and vice versa.

When a certain amount of caprolactam has been recognized as optimal and softness is yet further to be improved somewhat, a specific softener, or a mixture of specific softeners, can additionally be used in the preparation of the composition according to the present invention. The preference here as an additional softener is for an amide formed from a monocarboxylic acid having 12 to 24 carbon atoms and preferably having 16 to 20 carbon atoms and a monofunctional or polyfunctional aliphatic amine, preferably diethylenetriamine. A particularly preferred additional softener is a reaction product of 2 mol of a comparatively long-chain aliphatic monocarboxylic acid with 1 mol of diethylenetriamine. Another is the stearamide derived from stearic acid and ammonia. The use of such additional softeners makes it possible to keep the amount of caprolactam down and yet endow the textiles with a soft hand. The advantage is an improved durability of the flame retardant properties of finished fiber materials is compared with the use of compositions comprising a higher proportion of caprolactam. In certain cases, the use of an additional softener of the type mentioned can cause the composition obtained to handle less than ideally and therefore have disadvantages in use. In these cases, it is preferable when the preparation of the corresponding compositions according to the present invention additionally utilizes one or more of the following products:

monoalkyl ethers of an ethoxylated polyhydric aliphatic alcohol, wherein the underlying alcohol contains 3 to 12 carbon atoms in nonethoxylated form, an imidazoline disubstituted with a hydroxyalkyl group and with an alkenyl group.

A 1,1,1-trimethylolpropane where one of the terminal OH groups is etherified with 1-methyl polyethylene glycol will prove advantageous in this context. Such a product is available from Tego Chemie, Essen, Germany, as Tegomer D 3403.

A further highly suitable product is 2-(2-heptadec-8-enyl-2-imidazolin-1-yl)ethanol, i.e., a disubstituted imidazoline of CAS No. 95-38-5. Such a product is available from Sasol Germany GmbH, Germany, under the name Marlowet 5440.

Ethylene glycol is a product which will prove advantageous as an additive in the preparation of a composition according to the present invention. It frequently makes it possible to achieve a softer hand for finished fiber materials.

It may be advantageous in some cases to additionally use small amounts of formaldehyde and/or of an acidic orthophosphoric ester in the preparation of compositions according to the present invention. A suitable phosphoric ester is dialkyl phosphate which can act as a defoamer during the reaction. Adding formaldehyde may in certain circumstances achieve stabilization for the starting mixture.

A preferred embodiment of compositions according to the present invention consists in their preparation additionally utilizing the following amounts of additional products as well as THP salt, water, caprolactam and urea:
0.5 to 8 g of an above-described amide of a monocarboxylic acid
3 to 20 g of monoalkyl ether of an ethoxylated polyhydric aliphatic alcohol as described above
3 to 20 g of disubstituted imidazoline
6 to 18 g of monoethylene glycol.

These amounts are based on 1 mol of tetrakishydroxyalkylphosphonium cations (THP ions) originally used.

After the total amount of caprolactam has reacted in the preparation of a composition according to the present invention, THP salt and excess urea will normally combine to form a condensation product which is known from the prior art and described for example in the patent documents mentioned at the beginning. It is a condensate of a tetrakishydroxyalkylphosphonium (THP salt) and urea. The preferred THP salt is tetrakishydroxymethylphosphonium chloride (THPC, CAS No. 124-61-1) or tetrakishydroxymethylphosphonium sulfate or a mixture thereof. THPC is obtainable by commonly known methods, or available from FEBEX S. A., Switzerland. Tetrakishydroxyethylphosphonium chloride or sulfate can also be used as THP salt. THP salt can be reacted with urea by methods described in the literature, for example via condensation reaction by refluxing a mixture containing 7200 parts by weight of 80% THPC, 1000 parts by weight of urea, 450 parts by weight of water and 300 parts by weight of ethylene glycol. Appropriate details for performing the reaction are available from U.S. Pat. No. 2,983,623. The condensate formed, albeit without addition of ethylene glycol, is known under CAS No. 27104-30-9.

A preferred method of preparing the compositions according to the present invention consists in first preparing a mixture containing water, caprolactam and also an excess of THP salt and then adding an excess of urea to prepare a condensation product of THP salt, caprolactam and urea and then, from excess urea and with excess THP salt, a THP salt/urea condensate and optionally adding further products before or after the addition of urea. This method thus requires the use of an excess of THP salt compared with the amount needed to form the THP salt-caprolactam-urea condensation product. As soon as the reaction of THP salt with caprolactam has ended, urea is added, leading to the formation of a condensate of THP-caprolactam condensate and urea, and subsequently to forming a condensate of excess urea and excess THP salt.

The preferred method of preparing compositions according to the present invention thus is characterized in that first a condensate is prepared from an excess of THP salt and from caprolactam and this condensate is then reacted with urea and subsequently excess THP salt present during the reaction and excess urea are condensed to form a THP salt-urea condensate, wherein further components are optionally added before or after the preparation of the composition.

The THP salt:urea mixing ratio in the condensation reaction can influence the properties of the end product and hence the possible uses. The same holds for the THP salt:caprolactam:urea mixing ratio.

Compositions according to the present invention are normally prepared using commercially available THP salt containing about
65% to 85% by weight of THP salt and
15% to 35% by weight of water.

The condensation reaction normally generates an aqueous system which contains the two types of condensate described and optionally further desired additives. This system can be used directly for treating fiber materials, in which case the system is, if desired, first diluted to use concentration.

The compositions according to the present invention are very useful for flame retardant finishing of fiber materials, endowing the latter not only with good flame retardant properties but also a pleasantly soft hand coupled with good durability of the effects with regard to laundering operations. The fiber materials here are preferably textile fabrics in the form of wovens, knits or nonwovens. They preferably consist of cotton or other cellulose materials to an extent in the range from 50% to 100% by weight. Fiber materials useful for protective clothing, home textiles and technical/industrial textiles are obtainable in this way, inter alia.

The compositions according to the present invention can be applied to the fiber materials by commonly known methods, for example by pad-mangle impregnation with subsequent drying. Cotton articles may be subjected to a subsequent ammonia aftertreatment of the kind known from the literature.

The invention will now be illustrated by working examples.

EXAMPLE 1

(Comparative Example, not According to the Invention)

A condensate of tetrakishydroxymethylphosphonium chloride (THPC) and urea was prepared as described in Example 1 of U.S. Pat. No. 2,983,623 by starting from 500 parts by weight of water, 7200 parts by weight of 80% by weight THPC solution in water and 1000 parts by weight of urea, except that an additional 300 parts by weight of ethylene glycol was added to the mixture of starting materials.

EXAMPLE 2

(According to the Invention)

A vessel equipped with a reflux condenser was initially charged with 2 mol of THPC in the form of an 80% by weight mixture with water. 4 mol of water were added and the pH is was adjusted to about 5-6 using 0.2 mol of 50% aqueous potassium hydroxide solution. This was followed by the addition of 0.02 mol each of an imidazoline derivative (CAS No. 95-38-5) and of a fatty acid aminoamide (prepared from stearic acid and diethylenetriamine). The mixture was heated to about 100° C. and 0.2 mol of caprolactam was added, the mixture was refluxed at about 100° C. Then, 0.9 mol of urea was added and the mixture was maintained at 105° C. for about 30 minutes. Then, 0.4 mol of ethylene glycol was added and the mixture was allowed to cool down to room temperature to obtain a slightly yellowish, slightly cloudy product.

EXAMPLE 3

(According to the Invention)

3 mol of THPC in the form of an 80% by weight solution in water were initially charged and 3 mol of water were additionally added. Then, 7.5 g (0.075 mol) of formaldehyde in the form of a 35% by weight aqueous solution were added. Further 0.015 mol of a nonionic polyether (Tegomer® D 3403, available from Tego Chemie, Essen, Germany), 0.3 mol of caprolactam, 3.5 g of an acid aminoamide (obtained from stearic acid and diethylenetriamine) were added and the mixture was refluxed at 100° C. for 3 hours. After cooling to 80° C., 0.11 mol of dibutyl phosphate was added, before stirring for 5 minutes and then adding 1.5 mol of urea. The mixture was heated to 105° C. and maintained at 105° C. for 30 minutes. Then, 0.6 mol of monoethylene glycol was added and the mixture was allowed to cool down to room temperature to obtain a slightly colored, slightly cloudy product.

The products of Examples 1 to 3 were used to treat woven 100% cotton fabrics via pad-mangle application before drying. This was followed by an ammonia aftertreatment of the type known from the prior art. The woven fabrics thus obtained were tested for flammability and hand assessed.

The wet pick-up (weight increase by pad-mangle impregnation, determined on dried fabric) was about 80% in all 3 cases.

The woven fabric samples thus obtained were tested for flammability before and after 50 washes at 95° C. In addition, the fabric hand was assessed each time. The hand was assessed on a scale from 1 to 5, where 1 denotes a poor/harsh hand and 5 denotes a very pleasant soft hand.

Flammability was determined on the 3 fabric samples not only before washing but also after 50 washes at 95° C. A comparison of the values determined on the same sample before and after washing provides information as to the durability of the flame retardant effect.

The results obtained are shown in Table 1.

TABLE 1

|  | Hand |
|---|---|
| Example 1 | 2 |
| Example 2 | 4 |
| Example 3 | 5 |

The 3 samples all exhibited good flame retardancy not only before washing but also after 50 washes at 95° C. In other words, not only the samples which had been treated with compositions according to the present invention but also the sample not according to the invention showed good durability of the flame retardant effect.

The invention claimed is:

1. A composition for the flame retardant finishing of fiber materials, which is obtained by adding caprolactam to a mixture of water and a tetrakishydroxyalkylphosphonium (THP) salt at an amount from 0.03 to 0.9 mol of caprolactam per mol of tetrakishydroxyalkylphosphonium cations (THP ions), subsequently maintaining the mixture at about 100° C. until essentially no free caprolactam is present any longer, and then optionally adding urea to the mixture and maintaining the mixture at a temperature of about 105° C. for at least 10 minutes, the amount of urea added being in the range from 0 to 0.7 mol per mol of THP ions originally used.

2. The composition according to claim 1, characterized in that the THP salt is tetrakishydroxymethylphosphonium chloride or tetrakishydroxymethylphosphonium sulfate or a mixture thereof.

3. The composition according to claim 1, characterized in that an amide formed from a monocarboxylic acid having 12 to 24 carbon atoms and a monofunctional or polyfunctional aliphatic amine is added to the mixture.

4. The composition according to claim 1, characterized in that one or more of:
   a monoalkyl ether of an ethoxylated polyhydric aliphatic alcohol, wherein the underlying alcohol contains 3 to 12 carbon atoms in nonethoxylated form,
   or an imidazoline disubstituted with a hydroxyalkyl group and with an alkenyl group is added to the mixture.

5. The composition according to claim 1, characterized in that monoethylene glycol is added to the mixture.

6. A process for flame retardant finishing a fiber material comprising applying the composition of claim 1 to the fiber material.

7. The process according to claim 6, characterized in that the fiber material is a textile fabric in the form of woven, knit or nonwoven.

8. The process according to claim 6, characterized in that the fiber material comprises cotton to an extent in the range from 50% to 100% by weight based on the total weight of fiber material.

* * * * *